United States Patent
Thomasson

(10) Patent No.: US 6,278,785 B1
(45) Date of Patent: Aug. 21, 2001

(54) ECHO CANCELLING PROCESS WITH IMPROVED PHASE CONTROL

(75) Inventor: Samuel L. Thomasson, Gilbert, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 0 days.

(21) Appl. No.: 09/401,349

(22) Filed: Sep. 21, 1999

(51) Int. Cl.[7] .............................. H04B 3/20; H04M 1/00; H04M 9/00
(52) U.S. Cl. .............................. 381/66; 381/97; 379/406; 379/410
(58) Field of Search .................. 381/66, 71.8, 71.9, 381/71.14, 94.1, 94.2, 94.3, 97, FOR 124; 379/406, 409, 410, 411; 370/290

(56) References Cited

U.S. PATENT DOCUMENTS

| | | | |
|---|---|---|---|
| 3,735,055 | * 5/1973 | Thomas | 379/406 |
| 3,794,766 | * 2/1974 | Cox et al. | 381/66 |
| 3,903,377 | 9/1975 | Sato | 179/170.2 |
| 4,480,156 | 10/1984 | Takahashi et al. | 179/170.2 |
| 4,813,073 | * 3/1989 | Ling | 379/410 |
| 4,817,081 | * 3/1989 | Wouda et al. | 379/411 |
| 5,113,389 | * 5/1992 | Cox | 379/406 |
| 5,311,503 | * 5/1994 | Kokubo et al. | 379/411 |
| 5,323,459 | * 6/1994 | Hirano | 381/66 |
| 5,359,656 | * 10/1994 | Kim | 379/410 |
| 5,425,098 | * 6/1995 | Kamiya | 379/410 |
| 5,473,686 | * 12/1995 | Virdee | 379/410 |
| 5,649,019 | 7/1997 | Thomasson | 381/83 |
| 5,675,644 | * 10/1997 | Sih | 379/410 |
| 5,682,378 | * 10/1997 | Betts et al. | 379/410 |
| 5,721,772 | * 2/1998 | Haneda et al. | 379/406 |
| 5,737,410 | * 4/1998 | Vahatalo et al. | 379/410 |
| 5,859,914 | * 1/1999 | Ono et al. | 381/66 |
| 5,901,233 | * 5/1999 | Hockney et al. | 381/94.3 |
| 5,940,455 | * 8/1999 | Ikeda | 379/410 |
| 6,047,022 | * 4/2000 | Reuven | 379/410 |
| 6,108,413 | * 8/2000 | Capman et al. | 379/410 |
| 6,166,573 | * 12/2000 | Moore et al. | 327/161 |

FOREIGN PATENT DOCUMENTS 6-13939 * 1/1994 (JP) ....................... 379/410

* cited by examiner

*Primary Examiner*—Xu Mei
(74) *Attorney, Agent, or Firm*—Paul F. Wille

(57) ABSTRACT

An echo is cancelled from a composite signal by providing a coarse phase adjustment, a fine phase adjustment, an amplitude correction, and then subtracting the phase shifted signal from the composite signal. In the coarse adjustment, the phase is slightly under-corrected, thereby allowing the fine adjustment to proceed in a single direction and decreasing convergence time. Correlation is provided by an amplitude inverting multiplying circuit and phase adjustment is provided by an all-pass phase shift network combined with an impedance multiplier coupled to the phase shift network.

16 Claims, 6 Drawing Sheets

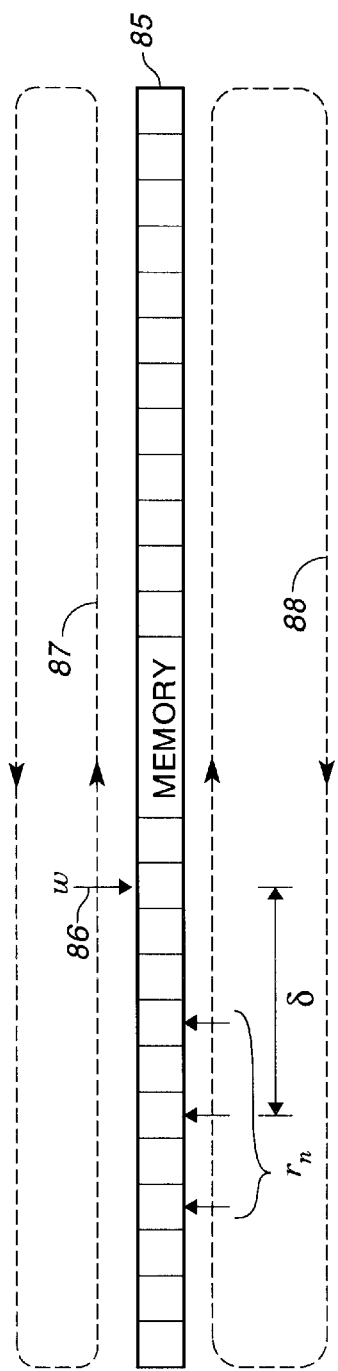
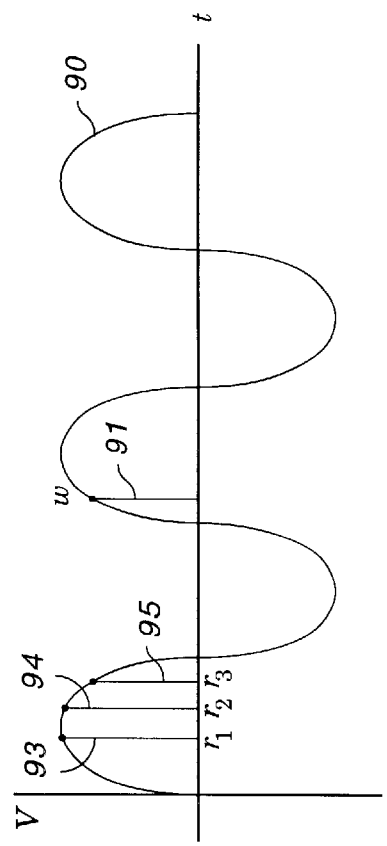
FIG. 7
FIG. 8

ECHO CANCELLING PROCESS WITH IMPROVED PHASE CONTROL

CROSS-REFERENCE TO RELATED APPLICATION

This application shares some disclosure with application Ser. No. 09/361,014, filed Jul. 23, 1999, entitled "High Resolution Delay Line", assigned to the assignee of this invention, and now U.S. Pat. No. 6,166,573.

This application also relates to application Ser. No. 09/401,348, filed on even date herewith, entitled "Wide Range, Variable Phase Shift Circuit," assigned to the assignee of this invention, currently pending. The contents of said application are incorporated by reference herein.

BACKGROUND OF THE INVENTION

This invention relates to circuits for reducing acoustic feedback in electro-acoustic systems such as public address systems, telephones, and hearing aids and, in particular, relates to reducing feedback by precisely matching an echo in phase and amplitude.

Sound waves are slight variations in air pressure that a microphone converts into an electrical signal of varying amplitude. In a public address system and other electro-acoustic communications systems, the electrical signal is amplified and converted back into sound waves by one or more speakers.

In theory, a signal passes through a system once, never to return. Outdoors and in well designed auditoriums or concert halls, this is essentially true. In other situations, there can be a significant level of acoustic coupling between the speakers and the microphone, e.g., in a "speaker phone." When the output of an amplifier is coupled to the input of the amplifier, one has feedback, a closed loop with the potential to oscillate.

Acoustic feedback can cause a mild echo or a self-sustaining ring, depending upon the loudness of the sound returning to the microphone. The cause of the feedback can be poor placement of a speaker relative to the microphone, walls that reflect sound, and/or simply having the volume set too high on an amplifier. Electronic echo can be caused by discontinuities in the transmission medium of a telephone system or by unintended coupling between lines. Components, such as speakers and microphones, and electronic circuits introduce random variations in phase and amplitude because no two components are actually identical even if the components are the same brand and model. For example, substituting one speaker for another can affect the amplitude and phase of the feedback, as can changing the placement of a speaker or of a microphone.

There are two difficulties to eliminating feedback in an acoustic system. One difficulty is determining whether the signal passing through the amplifier is from an echo or from an original sound. A second difficulty is determining the travel time of the echo.

U.S. Pat. No. 5,412,734 (Thomasson) discloses an system for eliminating feedback by tagging the original sound with an inaudible replica of that sound, wherein the replica is a frequency modulated (FM) high frequency carrier. U.S. Pat. No. 5,649,019 (Thomasson) discloses a similar system, wherein the replica is a pulse width modulated (PWM) high frequency carrier. The replica is used to reconstruct the original signal, which is then subtracted from a composite signal, i.e. a signal representing an echo combined with other sounds. The contents of the Thomasson patents are incorporated herein by reference.

Although these patents describe effective techniques, it is desired to provide a system that does not require tagging but is compatible with tagging. Further, it is desired to provide a method and apparatus for precisely matching the phase and amplitude of a second signal and an echo in order to cancel the echo. Attempts to match phase precisely are either absent or are ineffective in systems of the prior art. Without precise phase matching, one has a positive feedback system that can oscillate.

The term "phase" is often understood implicitly as a function of frequency, i.e., phase as a fraction of a single cycle of a signal. As used herein, phase can have any value, e.g. 750°. Thus considered, phase becomes more of a question of time than of frequency. As used herein, "phase" or "phase difference" and "delay" are considered synonymous.

Signals can be phase shifted by a number of different techniques, e.g., reactive networks, transmission lines, sampling and storing for later readout, and analog to digital (A/D) conversion and storing in digital memory for later readout.

The sampling rate of A/D converters in telephone systems is typically 8,000 samples per second. This number was chosen because of the relatively narrow bandwidth of a telephone system, 300–3,400 Hz, and because of the speed limitations of digital signal processing (DSP) devices. At 8,000 samples per second, the samples are separated by 125 microseconds and a 3.4 kilohertz signal is sampled only 2.3 times per cycle. This is not particularly good resolution. Stated another way, phase can be matched to within only 157° at 3.4 kilohertz.

In order to increase resolution, one must increase the number of samples, which causes a corresponding increase in the number of storage sites. The number of storage sites is limited by the cost of manufacturing suitable integrated circuits and the complexity of addressing the sites in real time.

In an analog system, a signal can be sampled and the samples stored in a plurality of switched capacitors, typically the gate structure of a field effect transistor (FET). However, the storage time for the samples is presently limited by the characteristics of the storage node to approximately one half second without some sort of refreshing. For longer storage times, A/D conversion and memory storage are necessary.

A large number of storage sites adversely affects the time for the system to lock onto the delay, referred to herein as convergence. In a constantly changing environment, such as a telephone, electronic delays can change during a call and acoustic delays can change during a call because a person moves about a room. In the prior art, the settings for an echo canceling circuit are not changed during a call, largely due to a long convergence time.

Thus, the problem exists of measuring large differences in phase accurately and precisely and matching the differences between two signals to enable an effective cancellation of an echo.

In view of the foregoing, it is therefore an object of the invention to provide apparatus for accurately finding and matching phase with an echo.

A further object of the invention is to improve the ability to match amplitude by precisely matching the phase of two signals or portions of two signals.

Another object of the invention is to provide a method for precisely matching the phase of two signals or portions of two signals even when one of the signals is delayed by as much as 1,500 milliseconds relative to the other signal.

SUMMARY OF THE INVENTION

The foregoing objects are achieved in this invention wherein an echo is cancelled from a composite signal by providing a coarse phase adjustment, a fine phase adjustment, an amplitude correction, and then subtracting the phase shifted signal from the composite signal. The coarse phase adjustment and the fine phase adjustment each include simultaneously delaying the original signal a first period, a second period, and a third period, to produce three signals, $x_1$, $x_2$, and $x_3$, correlating signal $x_1$ with the signal to produce a first correlation signal $c_1$, correlating signal $x_3$ with the signal to produce a second correlation signal $c_2$, combining $c_1$ and $c_2$ to produce a first difference signal $\Delta_1$, adjusting the first period, the second period, and the third period in accordance with $\Delta_1$ until $\Delta_1$ is substantially equal to zero, and subtracting $x_2$ from the signal. In the coarse adjustment, the phase is slightly under-corrected, thereby allowing the fine adjustment to proceed in a single direction and decreasing convergence time. Correlation is provided by an inverting, multiplying circuit and phase adjustment is provided by an all-pass filter combined with an impedance multiplier.

BRIEF DESCRIPTION OF THE DRAWINGS

A more complete understanding of the invention can be obtained by considering the following detailed description in conjunction with the accompanying drawings, in which:

FIG. 7 is a diagram illustrating the operation of a delay network:;

FIG. 8 is a chart illustrating the operation of FIG. 7;

DETAILED DESCRIPTION OF THE INVENTION

Figure 1:
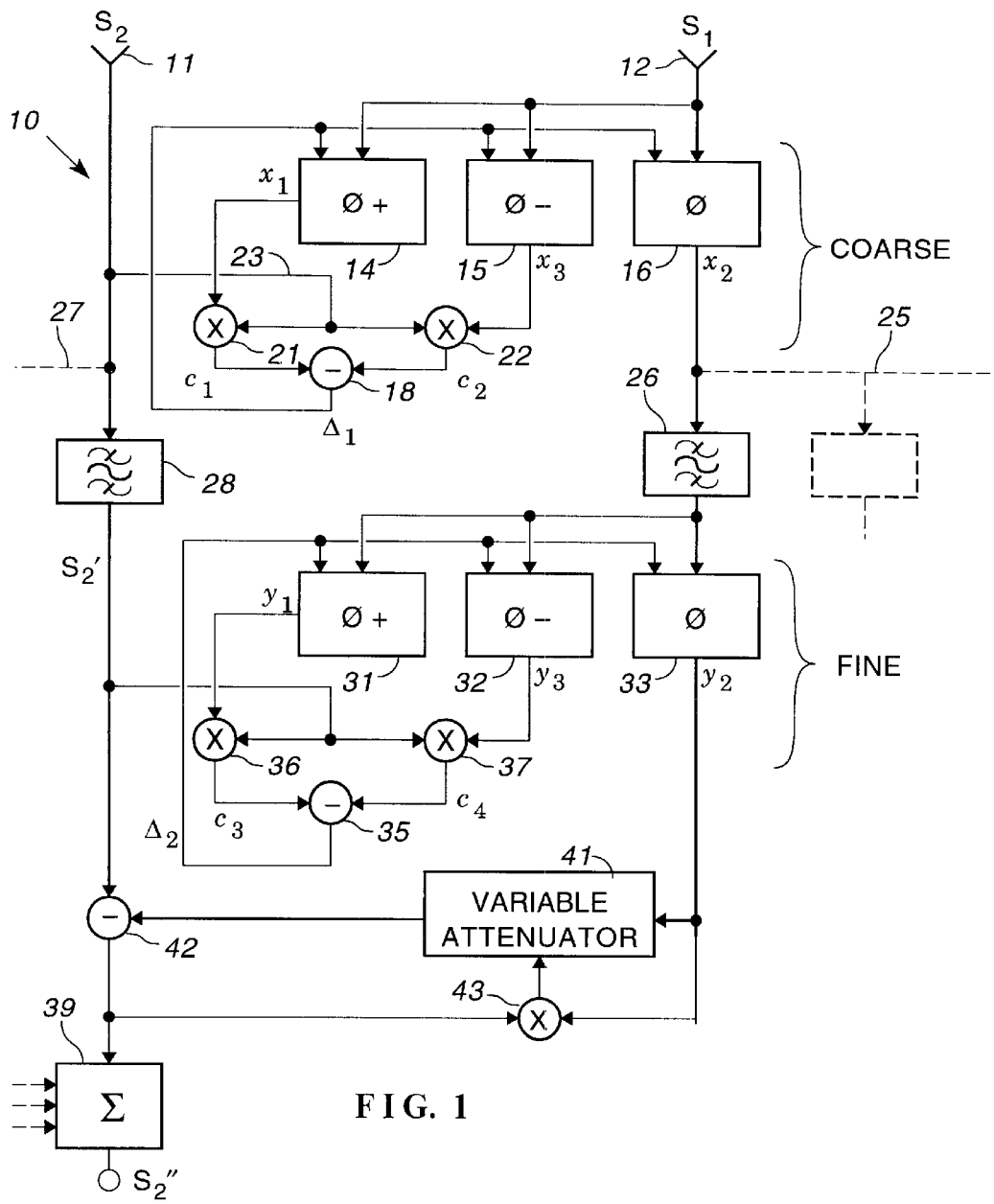
FIG. 1 is a block diagram of an echo cancelling circuit constructed in accordance with a preferred embodiment of the invention.

In FIG. 1, echo cancelling circuit 10 includes a coarse phase matching followed by fine phase matching and then amplitude matching for removing an echo. Circuit 10 can be used to prevent an acoustic echo from entering the telephone line or to prevent line echo from entering the speaker in a telephone. For cancelling acoustic echo, input 11 is coupled to a microphone and receives a "composite" signal $S_2$, i.e., signal plus echo from the microphone. Signal $S_2"$ is the line output to the telephone. Input 12 receives a component signal, $S_1$, going to the speaker. If the sound from the speaker (or any portion of it) reaches the microphone, it becomes the echo that must be removed from the composite signal.

For cancelling line echo, input 11 is coupled to the line input of the telephone and receives composite signal $S_2$. Signal $S_2"$ is the output to the speaker. Input 12 receives the component signal $S_1$ going to the line output.

In either case, component signal $S_1$ must be delayed to be matched in phase with the echo in composite signal $S_2$.

In a preferred embodiment of the invention, the phase matching circuitry include three, substantially identical phase shifting circuits 14, 15, and 16 in the form of voltage controlled, all-pass filters, described in detail in connection with FIG. 5. As indicated by the legends within the blocks, phase shift circuit 14 produces a slightly greater phase shift than circuit 16 and phase shift circuit 15 produces a slightly smaller phase shift than circuit 16.

The outputs from phase shift circuits 14 and 15 are each correlated with $S_2$ to determine whether or not the amount of phase shift is correct. Specifically, output signal $x_1$ from phase shift circuit 14 is coupled to one input of multiplier 21 and $S_2$ is coupled to another input of multiplier 21 by line 23. Output signal $x_3$ from phase shift circuit 15 is coupled to one input of multiplier 22 and $S_2$ is coupled to another input of multiplier 22 by line 23. Output signals $c_1$ and $c_2$ from multipliers 21 and 22 are subtracted in difference circuit 18. Output signal $\Delta_1$ from difference circuit 18 is coupled to the control inputs of phase shift circuits 14, 15, and 16. All three phase shifting circuits are adjusted in the same way at the same time.

Figure 2:
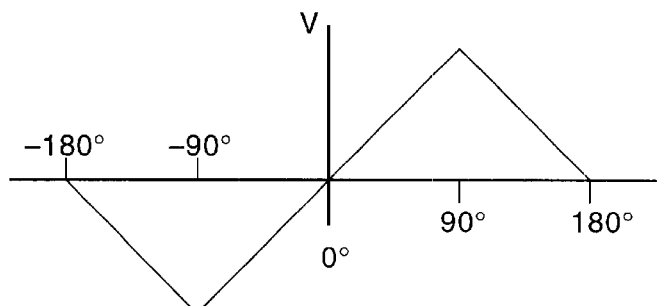
FIG. 2 illustrates the operation of a portion of the circuitry in FIG. 1.

Multipliers 21 and 22 each include an averaging or a low pass filter circuit to smooth the output signal. When the best phase match is obtained, the outputs from multipliers 21 and 22 will be approximately equal in magnitude and subtracting the signals produces the signal ($\Delta_1$) illustrated in FIG. 2 as a chart of voltage versus phase difference. As a match is found, output signal $\Delta_1$ converges toward zero from either direction. Because of noise or slight variations in circuit parameters, $\Delta_1$ may reach a minimum rather than zero. In any case, the control loop converges rapidly, within fifteen milliseconds or so, on a solution and remains stable for as long as the input signals are unchanged.

In accordance with another aspect of the invention, output signal $x_3$ from phase shift circuit 16 always lags $S_2$ when a match is indicated by output signal $\Delta_1$ from difference circuit 18. This enables the fine phase correction to start at zero delay or phase shift and to converge rapidly on an exact match because the change in phase shift is in one direction only. The offset is easily obtained by setting circuit 16 to a phase shift that is not midway between circuits 14 and 15 but slightly closer to the phase shift of circuit 15. Note that this does not affect the symmetry of the control loop.

The circuitry for the fine phase adjustment is similar to the circuitry for the coarse phase adjustment, except that (1) the range of phase shift is smaller, (2) the resolution is higher, (3) the phase shift of the circuit operating on the signal is centered between the phase shifts of the circuits in the control loop, and (4) the signal is divided by a plurality of band pass filters, phase and amplitude adjusted in each band, and then summed.

Band pass filters and ancillary circuitry, represented by dashed line 25, are not shown explicitly in order to simplify the drawing by eliminating needless repetition. FIG. 1 illustrates the fine phase adjustment for a single frequency band; that is, elements corresponding to elements 26, 31, 32, 33, 35, 36, 37, 41, 42, and 43 are provided for each frequency band. Band pass filters per se are not part of this invention, although it is part of the preferred embodiment to use them for the fine adjustment. In one embodiment of the invention, five bands were used for a circuit covering 300 to 3,400 Hz. The signal from input 11 is similarly divided into a plurality of corresponding bands, as indicated by dashed line 27. Band pass filter 28 is one of the band pass filters and corresponds to band pass filter 26. Band pass filters are used in both signal paths to equalize the phase shifts introduced by the filters.

In FIG. 1, the slightly under-delayed signal $x_2$ from circuit 16 is coupled through band pass filter 26 to one input of each of phase shift circuits 31, 32, and 33. The control inputs to these circuits are coupled to the output of difference circuit 35. One input of difference circuit 35 is coupled to multiplier 36 and another input of difference circuit 35 is coupled to multiplier 37. Multiplier 36 correlates output signal $y_1$ from phase shift circuit 31 with $S_2'$ and multiplier 37 correlates output signal $y_3$ from phase shift circuit 32 with $S_2'$. The fine correction operates as described above for the coarse correction to bring the phase of $y_2$, the output signal from circuit 33, to within 0.5° or less of $S_2'$.

The output signals from band pass filter 28 and phase shift circuit 33 are subtracted in difference circuit 42, which can be implemented as a simple difference amplifier. Depending upon the relative amplitudes of the signals, the echo may be eliminated, reduced, or reversed in polarity by difference circuit 42. Correlator 43 looks for any remainder of $y_2$ in the output signal from difference circuit 42 and, if found, adjusts attenuator 41 accordingly. As a result, the echo is cancelled. The echo free signals from each band are combined in summation circuit 39, producing output signal $S_2''$.

There are several forms of variable attenuator that can be used to implement the invention. A preferred circuit for matching amplitudes is described in application Ser. No. 09/336,008, filed Jun. 18, 1999, currently pending, entitled "Precise Amplitude Correction Circuit", assigned to the assignee of this invention, and the contents of which are incorporated by reference herein.

Multiplier circuits, particularly in analog form, can be quite complex. In accordance with another aspect of the invention, a simple amplitude inverting multiplier or correlator has been found to be more than adequate for implementing the invention. A ring modulator is known in the art as an amplitude inverting multiplier circuit. Recent examples of such ring modulators are described in U.S. Pat. Nos. 5,455,543 and 5,455,544. An even simpler circuit is desired than the circuits described in the patents.

Figure 3:
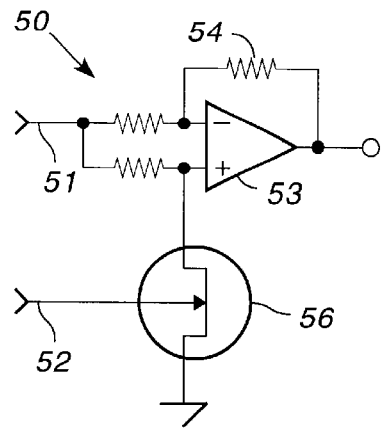
FIG. 3 is a schematic of a multiplier circuit.

In FIG. 3, multiplier 50 includes input 51 coupled to an inverting input of amplifier 53 and to a non-inverting input to amplifier 53. Resistor 54 provides negative feedback and is sized to provide unity gain. Input 52 is coupled to the gate of JFET 56, which is coupled between the non-inverting input of amplifier 53 and common. In a preferred embodiment of the invention, each of the multipliers shown in FIG. 1 was implemented by the circuit shown in FIG. 3.

Multipier 50 operates by inverting the analog signal on input 51 in accordance with the polarity of a signal on input 52. When JFET 56 is not conducting, the output signal from amplifier 53 is G times amplitude of the signal on input 51, where G is the gain of amplifier 53. When JFET 56 is conducting, the output signal from amplifier 53 is –G times amplitude of the signal on input 51.

Figure 4:
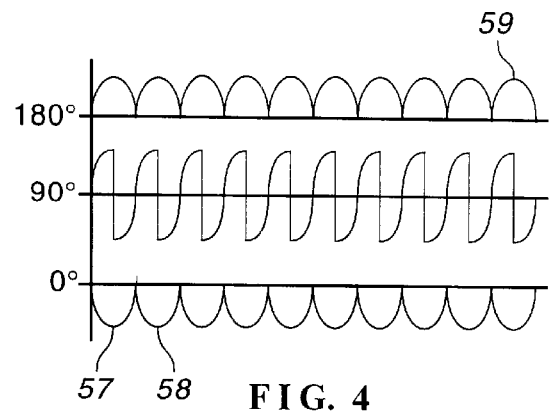
FIG. 4 illustrates the operation of the multiplier circuit.

FIG. 4 illustrates the output signal from amplifier 53 for a sinusoidal signal on input 51 and a phase difference of 0°, 90°, and 180° between the signals on the inputs. The signal on input 52 can be analog or digital (pulsed) and the less noisy signal is preferably coupled to input 52. The output signal averaged or smoothed before being used by other circuitry, e.g., as a control signal. If the less noisy signal is coupled to input 52, the polarity reversal will be relatively jitter free and noise from the other signal will average out quickly.

Assuming for the sake of example that the signals on both inputs are sinusoidal with a phase difference of zero degrees, the output signal during the first half cycle of the signal on input 51 is represented by curve 57. During the second half cycle, the polarity of the signal on input 51 has changed but so has the polarity of the signal on input 52. Thus, the polarity of the signal on input 51 is reversed, resulting in curve 58 for the second half cycle. If the input signals differ by ninety degrees, then the polarity of the output signal reverses midway during the first half cycle of the signal on input 51. If the input signals are 180° out of phase, then the output signal is as shown by waveform 59.

A circuit like the one shown in FIG. 3 is known in the art as a multiplying phase detector; see Brennan, Paul V., "*Phase-Locked Loops: Principles and Practice*", R. R. Donnelley & Sons Company (1996), pages 8–9. The circuit shown in FIG. 3 is not known in the art as a correlator, i.e., as suitable for detecting a component signal in a complex wave.

Figure 5:
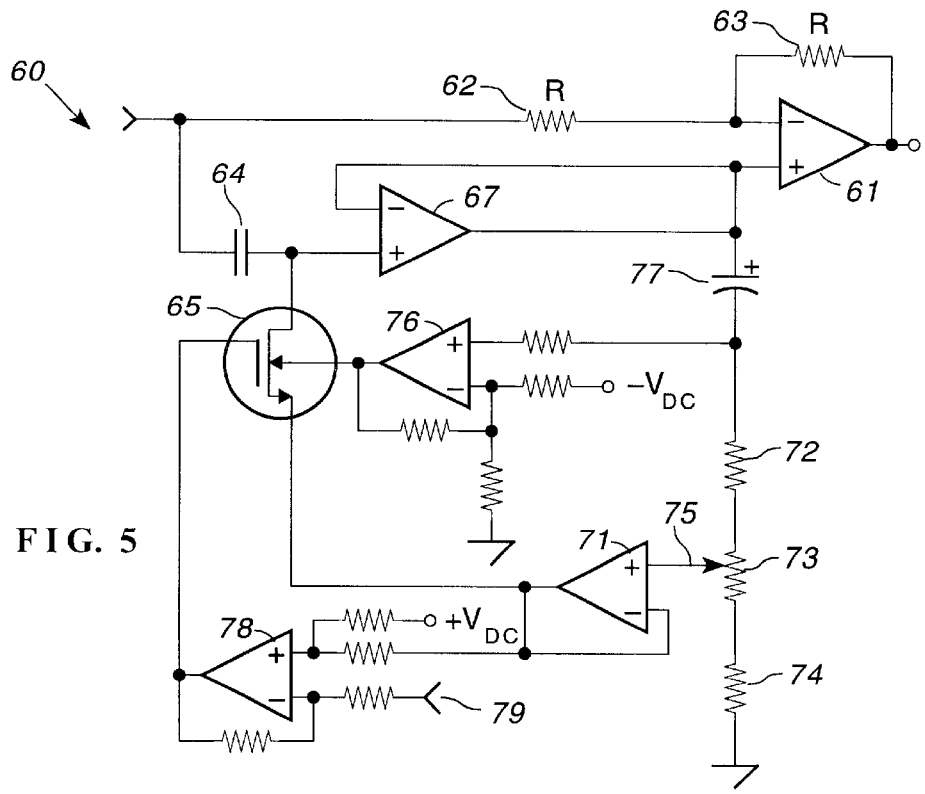
FIG. 5 is a schematic of a all-pass, phase shifting network constructed in accordance with another aspect of the invention.

FIG. 5 is a schematic of phase shift circuit 60 constructed in accordance with another aspect of the invention. The portion of the circuit including amplifier 61, coupling resistor 62, feedback resistor 63, capacitor 64, and transistor 65 forms an all-pass filter; that is, a filter that operates in the time domain rather than in the frequency domain. The circuit passes all frequencies without affecting amplitude but phase shifts in proportion to frequency. Such filters are described in detail in "*Electronic Filter Design Handbook*," A. B. Williams and F. J. Taylor, 3rd Ed., McGraw-Hill, Inc. 1995. The Williams et al. text is the only text known that describes all-pass filters in detail.

Transistor 65 is a programmable current source that enables one to adjust phase shift. In a simpler form of the circuit, a resistor is located where transistor 65 is, forming an RC circuit coupled between the input and common that determines phase shift. The simpler circuit has a limited range of phase shift and cannot be implemented as an integrated circuit (IC) because the component values are unattainable in IC form. What is desired is a phase shift circuit that can be included in an IC implementing substantially the entire circuit shown in FIG. 1. Except for the potentiometer and the coupling capacitor, such a circuit is shown in FIG. 5.

Amplifier 71 biases the drain of transistor 65 with a fraction of the input signal as determined by the voltage divider including resistors 72, 73, and 74. This bias decreases the current through transistor 65 and increases the impedance of the circuit, defined as input voltage divided by input current. The multiplication effect increases the dynamic range of transistor 65 and enables one to use relatively small valued capacitor for capacitor 64; e.g., 100 pf. Thus, capacitor 64 can be implemented in an integrated circuit. The circuit illustrated in FIG. 5 can sweep more than four orders of magnitude in frequency, a feat unattainable with circuits of the prior art.

Resistors 72 and 74 limit the range of multiplication and need not be equal. If the resistance above tap 75 is equal to the resistance below the tap, then the impedance multiplication is 2:1. If the resistance above tap 75 is R and the resistance below the tap is 99R, then the impedance multiplication is 100:1. In one embodiment of the invention resistor 72 had a resistance of 1.5 kΩ, resistor 73 had a resistance of 2.0 kΩ, and resistor 74 had a resistance of 100 kΩ.

The circuit including amplifier 67, the voltage divider, amplifier 71, and transistor 65 is reminiscent of, but quite different from, the circuits described in U.S. Pat. No. 5,652,537 (Fleeman) and in a book by the same author. The circuits disclosed in these publications are curiously described as having "active negative feedback" even though the inverting input of an amplifier is not used. In any event, the circuits described do not include transistor 65.

As recognized in the Fleeman patent, an FET would be highly non-linear because variations in $V_{ds}$ on the FET can create distortions in the circuit. Linearity is improved by reducing gate voltage, e.g., to less than ±50 millivolts, which may make the circuit operative in a technical sense but of little practical interest. The circuit shown in FIG. 5 is operative over a range of more than 5 volts. The Fleeman patent discloses an FET only in the voltage divider. By inference, using an FET as the multiplied impedance would multiply the non-linearity as well and should not be done.

In FIG. 5, amplifier 76 has a non-inverting input coupled to the junction of DC blocking capacitor 77 and resistor 72. An inverting input of amplifier 76 coupled to a source of negative DC bias and to a feedback network for reducing the amplitude of the signal applied to the substrate of transistor 65. Amplifier 78 has a non-inverting input coupled to tap 75 through amplifier 71 and to a source of positive DC bias. An inverting input of amplifier 78 is coupled to input 79 for receiving a control voltage from the output of one of the summation circuits in FIG. 1. Amplifier 76 biases the substrate of transistor 65 and amplifier 78 biases the gate of transistor 65. The resistances associated with these amplifiers are preferably equal valued, e.g., 100 kΩ. By thus biasing transistor 65, linearity and dynamic range are improved.

Figure 6:
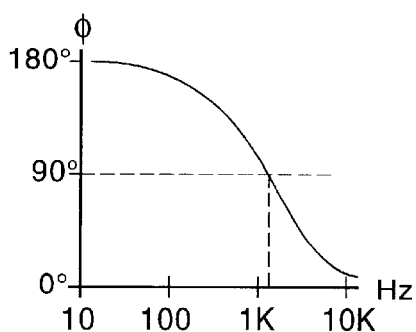
FIG. 6 is a chart of control voltage versus phase shift for the circuit in FIG. 4.

FIG. 6 illustrates the phase shift characteristic of circuit 60, wherein φ (phi) is phase shift. A phase shift of 90° is obtained when $\omega = 1/RC$. Thus, changing the control voltage changes the frequency at which a 90° phase shift occurs. A phase shift of 180° occurs as one approaches DC (zero Hz.) and a phase shift of 0° occurs as one approaches very high (∞) frequency.

As described thus far, the invention has been described as implemented in the frequency/phase domain using impedances for delay. The invention can also be implemented in the time domain, which enables longer delays to be accommodated.

FIG. 7 illustrates a delay line that operates in the time domain and can be used to implement the invention. Memory 85, which can be analog or digital, includes a plurality of storage sites that are consecutively addressed and written by suitable means, represented by arrow 86. As indicated by dashed line 87, arrow 86 moves in the direction indicated to address memory 85 sequentially and repeatedly.

The data is read by suitable apparatus following arrow 86, thereby introducing a delay into the signal from memory 85. The delay can be considerable, in excess of 500 milliseconds. Sampled at 8,000 samples per second with 12-bit resolution, memory 85 need only store 48,000 bits of data (48,000 storage sites, preferably addressed as words containing several bits) for one half second of data. Such memory is readily available and can easily fit into a cellular telephone, for example. In analog form, only 4,000 storage sites are needed for memory 85.

The number of storage sites between the write pointer and the read pointer is directly proportional to delay, represented as delta (δ) in FIG. 7. In accordance with the invention, three storage sites are read simultaneously. The three sites need not be consecutive but the second site is preferably one site removed from midway between the first site and the third site to facilitate the fine correction as described above.

The read operation is best understood by considering FIG. 8. Signal 90, which can have any waveform, is sampled and written to memory at a time indicated by pointer 91. The signal is later read at times indicated by pointers 93, 94, and 95. The first and third signals are correlated with $S_2$ (FIG. 1) to indicate in which direction to adjust the delay. If, for example, the signal from pointer 93 has the highest correlation, then the delay is increased (greater separation from write pointer 91) until correlations are equal and opposite at times 93 and 95.

Correlation should not be confused with the amplitude of the signal. The delayed signal is being read as the pointers move from left to right, as indicated by dashed line 88 in FIG. 7 and correlation may take place over several cycles of the input signal. Although convergence may take several cycles, convergence takes place quickly. With a delay line constructed in accordance with this aspect of the invention, convergence takes place in fifty milliseconds or less (within one hundred seventy cycles of a 3,400 Hz signal). Systems of the prior art converge in 500–3,000 milliseconds.

Figure 9:
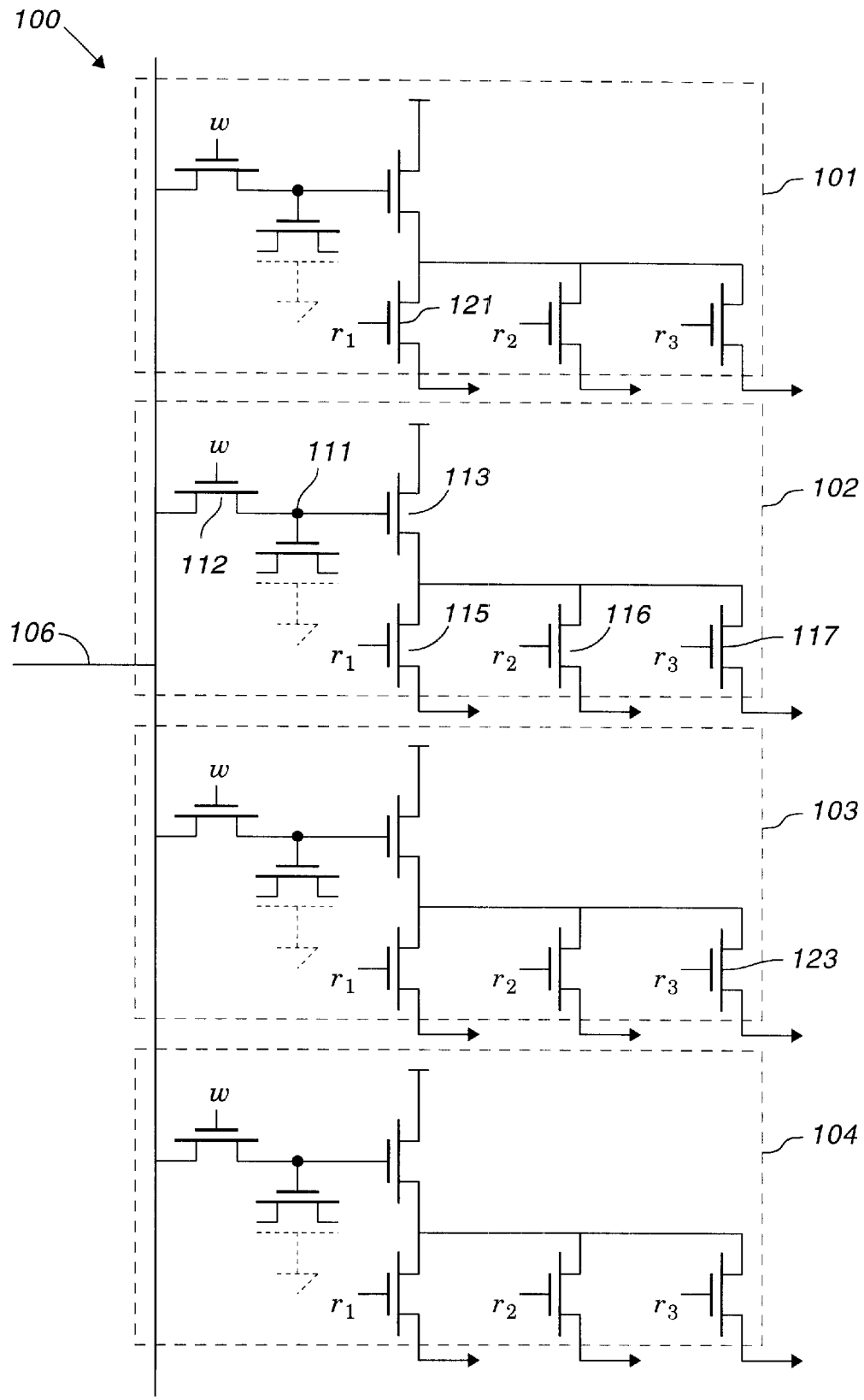
FIG. 9 is a schematic illustrating an analog sampling circuit for implementing FIG. 7.

FIG. 9 illustrates an analog implementation of the delay line illustrated in FIG. 7. Memory 100 includes a plurality of substantially identical storage sites, such as sites 101, 102, 103, and 104, connected in parallel to input 106. Input 106 corresponds to input 12 (FIG. 1) or may be coupled to input 12 by intermediate buffers, filters, and the like.

Storage site 102 includes storage node 111 coupled to input 106 by write gate 112. Storage node 111 is preferably the gate of an isolated FET (field effect transistor) that exhibits a capacitance relative to ground or common. The amplitude of the input signal is stored on node 111 during the moment that gate 112 is open. Node 111 is coupled through source follower 113 to read gates 115, 116, and 117. These read gates are never open simultaneously, although read gates 121, 116, and 123 may be open simultaneously.

A preferred embodiment of the invention includes differential voltages for improved performance. Thus, there are actually twice as many storage sites, one half for the signal and one half for the inverted signal. In a read operation, the difference in voltage between node 111 and the corresponding opposite node is read.

Figure 10:
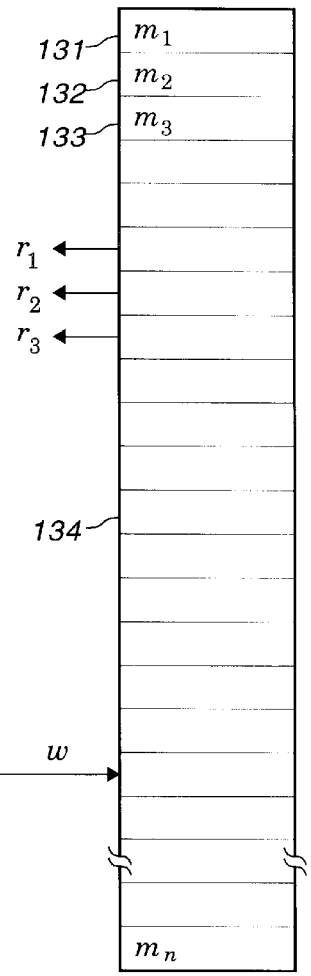
FIG. 10 is a diagram illustrating a digital implementation of FIG. 7.

FIG. 10 illustrates a digital implementation of the delay line illustrated in FIG. 7. Memory 130 includes a plurality of storage sites, such as sites 131, 132, 133, and 134. Each site has a unique address and includes a plurality of bits, as determined by the construction of the particular integrated circuit. Preferably, each "word" or group of bits corresponds to the resolution of the A/D converter used for writing data, e.g. twelve bits. The data is preferably stored in sequential addresses but need not be.

A/D converter 137 is coupled to input 12 (FIG. 1) by buffers, filters, and the like. An input signal is sampled and the amplitude of the sample is converted into a digital number that is stored in memory 130, e.g. at site 134. Data is read in the same order in which it was stored. As with the analog version, the number of sites between the read pointer and the write pointer determines the delay. The actual amount of delay, in seconds, depends also upon the clock rate.

A fine delay is constructed and operated in the same manner as coarse delay 81, with two exceptions. The sample rate is much higher, 100 kHz to 1 MHz or more, and there is only one read line, not three. In one embodiment of the invention, the fine delay is adjusted while monitoring the sum of the correlation coefficients for zero. Alternatively, one can use successive approximation, where the fine delay is preset to midrange and then increased or decreased to obtain maximum correlation.

In one embodiment of the invention, the coarse delay operated at 44,100 Hz. and stored 22,050 samples (500 millisecond maximum delay). The fine delay operated at 800,000 Hz and stored 400 samples (0.5 millisecond maximum delay). Note how little additional storage is required to provide the fine delay. Note too that the minimum coarse delay, 0.125 milliseconds, is less than the total fine delay. Thus, in this example, the fine delay can divide each coarse delay period into one hundred smaller periods, with overlap at each end to ensure continuity. The total fine delay is preferably equal to or greater than one half the minimum coarse delay.

Other combinations of sample rates can provide a wide range of delays and resolutions and, most importantly, can provide delays as long as 1.5 seconds or more at a resolution of tens of microseconds or less. This enables one to match phases to within less than one degree at 3,400 Hz. Further, one can combine digital coarse delay with an analog fine delay to provide a relatively easily implemented, inexpensive, yet precise system.

Figure 11:
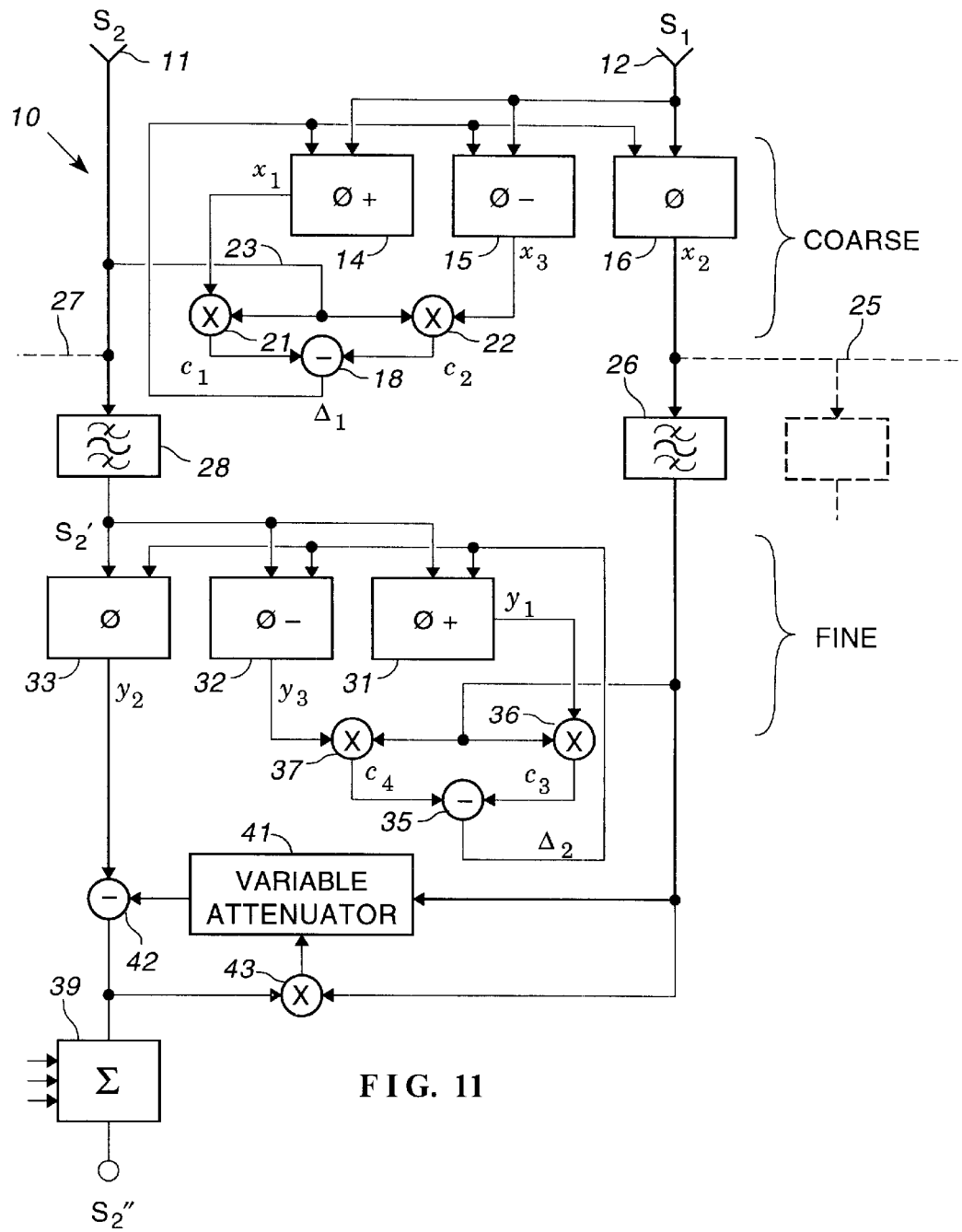
FIG. 11 is a schematic of an alternative embodiment of the invention.

FIG. 11 illustrates an alternative embodiment of the invention in which the coarse phase adjustment is in the $S_1$ side of the circuit and the fine phase adjustment is in the $S_2$ side of the circuit. The circuit operates in the same manner as the circuit shown in FIG. 1 except that $x_2$ is midway between $x_1$ and $x_2$ or slightly closer to $x_1$ in phase.

Figure 12:
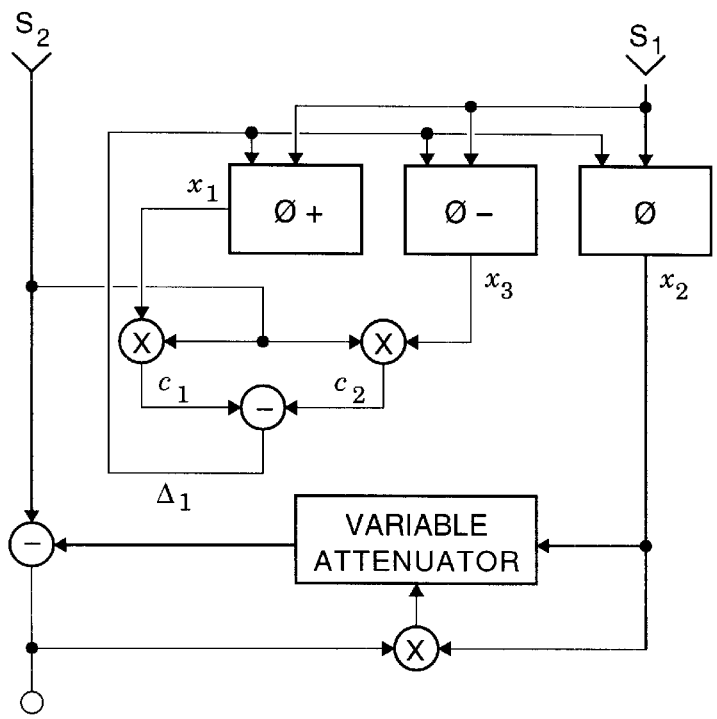
FIG. 12 is a schematic of another alternative embodiment of the invention.

FIG. 12 illustrates an alternative embodiment of the invention that can be used with relatively narrow band signals. In this embodiment, a single phase adjustment is made using three phase shifting circuits as before. Phase adjusted signal $x_2$ is adjusted in amplitude and subtracted from input signal $S_2$.

The invention thus provides improved echo cancelling apparatus for accurately finding and matching phase with an echo by precisely matching the phase of two signals or portions of two signals. The phase match can be made even when one of the signals is delayed by as much as 1,500 milliseconds relative to the other signal.

Having thus described the invention it will be apparent to those of skilled in the art that various modifications can be made within the scope of the invention. For example, if one were using only a single stage of phase shift, then the circuitry is adjusted for the best match possible. In some applications the parallel, band pass filters can be eliminated. Whether a circuit be called a summing circuit or a difference circuit is of no consequence as long as the input signals have the proper polarity. One could correlate with Ø+ only and have Ø a known increment behind but then one would have to detect peak correlation. It is faster and easier to detect zero volts than to detect a peak voltage. The band pass filters could be moved ahead of the coarse phase adjustment rather than between the coarse and fine phase adjustment.

What is claimed as the invention is:

1. A method for cancelling an echo component in a signal comprising the steps of:

simultaneously delaying the component a first period, a second period, and a third period, to produce three signals, $x_1$, $x_2$, and $x_3$;

wherein the second period is longer than the first period and the third period is longer than the second period;

correlating signal $x_1$ with the signal to produce a first correlation signal $c_1$;

correlating signal $x_3$ with the signal to produce a second correlation signal $c_2$;

combining $c_1$ and $c_2$ to produce a first difference signal $\Delta_1$;

adjusting the first period, the second period, and the third period in accordance with $\Delta_1$ until $\Delta_1$ is substantially equal to zero; and subtracting $x_2$ from the signal.

2. The method as set forth in claim 1 and further including the step of;

adjusting the amplitude of $x_2$ prior to subtracting $x_2$ from the signal.

3. The method as set forth in claim 1 wherein said adjusting step adjusts the first period, the second period, and the third period the same amount.

4. The method as set forth in claim 1 wherein the second period is longer than the first period by a first amount, the third period is longer than the second period by a second amount, and the first amount and the second amount are not equal.

5. The method as set forth in claim 4 wherein the first amount is larger than the second amount.

6. The method as set forth in claim 1 wherein each of said correlating steps includes the step of:

applying the signal to one input of an amplitude inverting multiplier circuit; and applying a phase shifted signal to the other input of the amplitude inverting multiplier circuit;

thereby producing a correlation signal at the output of the amplitude inverting multiplier circuit.

7. The method as set forth in claim 1 and further including the steps of:

simultaneously delaying $x_2$ a fourth period, a fifth period, and a sixth period, to produce three signals, $y_1$, $y_2$, and $y_3$;

wherein the fifth period is longer than the fourth period and the sixth period is longer than the fifth period;

correlating signal $y_1$ with the signal to produce a third correlation signal $c_3$;

correlating signal $y_3$ with the signal to produce a fourth correlation signal $c_4$;

combining $c_3$ and $c_4$ to produce a second difference $\Delta_2$; and adjusting the fourth period, the fifth period, and the sixth period in accordance with $\Delta_2$ until $\Delta_2$ is substantially equal to zero; and subtracting $y_2$ from the signal instead of subtracting $x_2$ from the signal.

8. The method as set forth in claim 7 and further including the step of;

adjusting the amplitude of $y_2$ prior to subtracting $y_2$ from the signal.

9. The method as set forth in claim 7 wherein the fourth period, the fifth period, the sixth period are adjusted the same amount.

10. The method as set forth in claim 7 wherein the second period is longer than the first period by a first amount, the third period is longer than the second period by a second amount, and the first amount and the second amount are not equal.

11. The method as set forth in claim 10 wherein the first amount is larger than the second amount.

12. The method as set forth in claim 1 and further including the steps of:
   (a) dividing the signal into a plurality of bands;
   (b) dividing $x_2$ into a plurality of bands corresponding to the bands for the signal and, within each band,:
      (i) simultaneously delaying $x_2$ a fourth period, a fifth period, and a sixth period, to produce three signals, $y_1$, $y_2$, and $y_3$;
      (ii) wherein the fifth period is longer than the fourth period and the sixth period is longer than the fifth period;
      (iii) correlating signal $y_1$ with the signal to produce a third correlation signal $c_3$;
      (iv) correlating signal $y_3$ with the signal to produce a fourth correlation signal $c_4$;
      (v) combining $c_3$ and $c_4$ to produce a second difference $\Delta_2$; and
      (vi) adjusting the fourth period, the fifth period, and the sixth period in accordance with $\Delta_2$ until $\Delta_2$ is substantially equal to zero;
   (c) subtracting $y_2$ from the signal in the corresponding band instead of subtracting $x_2$ from the signal to produce remainder signals; and
   (d) summing the remainder signals from all bands.

13. The method as set forth in claim 12 and further including the step of;
   adjusting the amplitude of the $y_2$ signals prior to subtracting.

14. The method as set forth in claim 12 wherein the fourth period, the fifth period, the sixth period are adjusted the same amount.

15. The method as set forth in claim 12 wherein the second period is longer than the first period by a first amount, the third period is longer than the second period by a second amount, and the first amount and the second amount are not equal.

16. The method as set forth in claim 15 wherein the first amount is larger than the second amount.

* * * * *